United States Patent [19]
Farrissey, Jr. et al.

[11] 3,714,130
[45] Jan. 30, 1973

[54] PROCESS FOR THE ANIONIC POLYMERIZATION OF CAPROLACTAM

[75] Inventors: William J. Farrissey, Jr., North Bradford; James S. Rose, Guilford; Adnan A. R. Sayigh, North Haven, all of Conn.

[73] Assignee: The Upjohn Company, Kalamazoo, Mich.

[22] Filed: Sept. 10, 1971

[21] Appl. No.: 179,549

[52] U.S. Cl..........260/78 L, 260/239.3 R, 260/561 R
[51] Int. Cl. ..........................................C08g 20/18
[58] Field of Search......................260/78 L, 239.3 R

[56] References Cited

UNITED STATES PATENTS 3,624,074 11/1971 Schmidt........................260/239.3 R

*Primary Examiner*—William H. Short
*Assistant Examiner*—L. M. Phynes
*Attorney*—Denis A. Firth et al.

[57] ABSTRACT

An improved process for the anionic polymerization of caprolactam is described. Trifluoroacetic anhydride is employed as promoter in amounts of 0.2 mole percent to 5.0 mole percent based on caprolactam. The use of trifluoroacetic anhydride permits lower reaction temperatures, higher yields of polyamide, and higher molecular weights of polymer.

4 Claims, No Drawings

PROCESS FOR THE ANIONIC POLYMERIZATION OF CAPROLACTAM

BACKGROUND OF THE INVENTION

1. Field of the Invention

This invention relates to the preparation of polyamides by the base-catalyzed, anionic polymerization of caprolactam and is more particularly concerned with improvements in the base-catalyzed polymerization of caprolactam.

2. Description of the Prior Art

The anionic base-catalyzed polymerization of cyclic lactams to yield the corresponding polyamides is widely known and described in the literature. It has been reported that a wide variety of materials can be used as initiators or promoters of the polymerization. We have now found that the use of a particular material as promoter in the anionic polymerization of caprolactam gives rise to highly useful results not shown with other initiators known in the art.

SUMMARY OF THE INVENTION

This invention consists in an improved process for the preparation of a polyamide by polymerizing caprolactam in the presence of a base catalyst and a promoter wherein the improvement comprises employing trifluoroacetic anhydride as promoter.

DETAILED DESCRIPTION OF THE INVENTION

The improved process of the invention is carried out substantially in accordance with procedures normally employed in the art in the base-catalyzed anionic polymerization of lactams, the essentially novel feature being the use of trifluoroacetic anhydride as the promoter.

Thus, in accordance with the invention the starting caprolactam is employed in substantially anhydrous conditions and is usually heated to melting point under nitrogen or other inert gas atmosphere before being treated with the base catalyst and the promoter. The catalyst and the promoter can be added in either order, or simultaneously, without significant effect on the outcome of the process. The resulting mixture is then heated to and maintained at a temperature within the range of about 85° C to about 250° C until the polymerization of the caprolactam has reached the desired stage.

While the reaction temperature can be maintained anywhere in the above range, it is preferably maintained in the range of about 95° C to about 155° C. It is to be noted that these temperature ranges encompass reaction temperatures markedly below those which have hitherto been necessary to accomplish the anionic polymerization of caprolactam. This lowering of the reaction temperature range is the direct result of the use of trifluoroacetic anhydride as promoter and represents the major advantage of using the latter.

The progress of the polymerization can be followed by observing the increase in viscosity or by any of the other techniques commonly used in the polymer art for this purpose. In the case where lower molecular weight polyamides (i.e. having molecular weights of the order of about 2,000) are desired, the resulting product will be a viscous liquid whereas, in the case of the higher molecular weight polyamides (i.e. having an average molecular weight of about 25,000) the resulting product will be a hard solid. In either event the resulting polymer is treated by known techniques to remove unreacted lactam and any residual catalyst and promoter. For example, in the case of the solid polymer, the product is ground to a fine powdery state and leached with water or chloroform to remove unreacted starting material. In the case of the liquid polymer, the latter is treated with a solvent such as chloroform, in which the polymer is insoluble and the starting materials are soluble.

The base catalyst which is employed in the process of the invention can be any of those used in the art for catalyzing the anionic polymerization of caprolactam. Illustrative of such catalysts are the alkali metal and alkaline earth metals, e.g. sodium, potassium, rubidium, caesium, magnesium and the like, either in the metallic form or in the form of their hydrides, borohydrides, oxides, hydroxides, carbonates, amides and the like. Organometallic derivatives of the alkali and alkaline earth metals are also useful as catalysts; illustrative of such derivatives are sodium, potassium, and lithium alkyls and aryls such as butyl lithium, butyl sodium, sodium phenyl and the like. A preferred catalyst based on availability, low price, and ease of working up the reaction mixture, is sodium hydride.

The amount of base catalyst employed can vary over a wide range from about 0.5 mole percent to about 10 mole percent based on caprolactam. Preferably however, the amount of base catalyst is within the range of about 2 mole percent to about 5 mole percent based on caprolactam.

The amount of trifluoroacetic anhydride employed as promoter in the process of the invention can also vary over wide limits. Advantageously, the amount of said anhydride is from about 0.2 mole percent to about 5.0 mole percent based on caprolactam. Preferably, the amount of said anhydride is from about 0.5 mole percent to about 2.0 mole percent based on caprolactam.

As pointed out above, the use of trifluoroacetic anhydride as promoter enables the anionic polymerization of caprolactam to be accomplished at significantly lower temperatures than hitherto possible. The advantages of operating at a lower temperature in such a reaction on a commercial product scale will be obvious to one skilled in the art. Further, this reduction in reaction temperature can be accomplished without any loss in overall yield of polyamide. Indeed, it is found that the yield of polyamide is, in fact, enhanced rather than reduced. In addition, the process of the invention enables one to produce polyamides of high molecular weight.

The following example describes the manner and process of making and using the invention and sets forth the best mode contemplated by the inventors of carrying out the invention but is not to be construed as limiting.

Example 1

A charge of 11.3 g (0.1 mole) of caprolactam (previously redistilled and dried in vacuo) was melted and purged of any residual moisture by flushing with a slow stream of nitrogen which was introduced by capillary tube dipping below the surface of the molten caprolactam. A total of 0.177 g (0.0042 mole) of a 57 percent dispersion of sodium hydride in oil was added dropwise to the molten caprolactam. The resulting mixture was heated to 125° C and maintained thereat while there was added 0.176 g (0.00084 mole) of trifluoroacetic anhydride. The mixture so obtained was maintained at 125° C with nitrogen purge for 24 hours. The resulting product was allowed to cool to room temperature. The solid so obtained was crushed with a hammer and pulverized in a high speed micromill then stirred with 200 ml of chloroform in a Waring blender to remove any residual caprolactam. The washed polymer was filtered under suction and dried. There was thus obtained 10.0 g (88 percent theoretical yield) of polycaproamide having an inherent viscosity of 1.10 (0.5 percent solution in 88 percent formic acid) corresponding to a molecular weight of 43,000.

The above procedure was repeated exactly as described but employing different reaction temperatures with the following result:

| Reaction Temp. (°C) | Yield Polyamide (%) | $\eta$ inh | Molecular Wt.(av.) |
|---|---|---|---|
| 135 | 85 | 0.90 | 30.000 |
| 145 | 97.5 | 1.04 | 37,000 |
| 155 | 100.6 | 1.65 | 87,000 |

We claim:

1. In a process for the preparation of a solid polyamide by polymerizing caprolactam in the presence of an anionic polymerization catalyst and an anionic polymerization promoter, the improvement which comprises employing trifluoroacetic anhydride as promoter.

2. The process of claim 1 wherein the base catalyst is sodium hydride.

3. The process of claim 1 wherein the trifluoroacetic anhydride is employed in an amount of about 0.2 to about 5.0 mole percent based on caprolactam.

4. The process of claim 1 wherein the polymerization is carried out at a temperature within the range of about 95° C to about 155° C.

* * * * *